United States Patent
Satheesh et al.

(10) Patent No.: US 11,849,170 B2
(45) Date of Patent: *Dec. 19, 2023

(54) SOFT UNIVERSAL REMOTE CONTROLLER

(71) Applicant: Caavo Inc, Milpitas, CA (US)

(72) Inventors: Sharath Hariharpur Satheesh, Bangalore (IN); Shivam Khandelwal, Jaipur (IN); Vinod K. Gopinath, Bangalore (IN)

(73) Assignee: Caavo Inc, Milpitas, CA (US)

(*) Notice: Subject to any disclaimer, the term of this patent is extended or adjusted under 35 U.S.C. 154(b) by 40 days.

This patent is subject to a terminal disclaimer.

(21) Appl. No.: 17/498,208

(22) Filed: Oct. 11, 2021

(65) Prior Publication Data

US 2022/0030296 A1    Jan. 27, 2022

Related U.S. Application Data

(63) Continuation of application No. 15/808,510, filed on Nov. 9, 2017, now Pat. No. 11,184,659.
(Continued)

(51) Int. Cl.
*H04N 21/422* (2011.01)
*H04N 21/41* (2011.01)
(Continued)

(52) U.S. Cl.
CPC ....... *H04N 21/42204* (2013.01); *G08C 17/02* (2013.01); *H04N 5/46* (2013.01);
(Continued)

(58) Field of Classification Search
CPC ....... H04N 21/42204; H04N 21/41265; H04N 5/46; H04N 21/42225; H04N 21/4227;
(Continued)

(56) References Cited

U.S. PATENT DOCUMENTS 9,838,584 B2   12/2017  Kumar et al.
11,184,659 B2  11/2021  Satheesh et al.
(Continued)

FOREIGN PATENT DOCUMENTS

EP    1931140 A1      6/2008
WO    2018/089671 A1  5/2018

OTHER PUBLICATIONS

International Preliminary Report on Patentability and Written Opinion received for PCT Patent Application No. PCT/US2017/060913, dated May 23, 2019, 9 pages.
(Continued)

*Primary Examiner* — John W Miller
*Assistant Examiner* — Omer Khalid
(74) *Attorney, Agent, or Firm* — WEAVER IP L.L.C.

(57) ABSTRACT

Methods for a soft universal remote (SUR) controller are performed by systems and apparatuses. Audio/visual (A/V) devices may be controlled by hardware remote controllers that are not configured to control other devices of an audio/visual system. A SUR controller implemented by an A/V device provides consumable control signals to such other devices based on control signals from the A/V device remote controller. A SUR controller determines another device for which a received control function is directed, and transmits a generated consumable control signal for the control function of the received control signal to the other device. User interfaces are provided by SUR controllers for the configuration of SUR controllers and remote controllers, and for control of other A/V devices via the user interfaces.

21 Claims, 5 Drawing Sheets

Related U.S. Application Data

(60) Provisional application No. 62/420,242, filed on Nov. 10, 2016.

(51) Int. Cl.
  *H04N 21/47* (2011.01)
  *H04N 21/4227* (2011.01)
  *H04N 21/643* (2011.01)
  *H04N 5/46* (2006.01)
  *H04N 21/485* (2011.01)
  *G08C 17/02* (2006.01)

(52) U.S. Cl.
  CPC ... *H04N 21/41265* (2020.08); *H04N 21/4227* (2013.01); *H04N 21/42225* (2013.01); *H04N 21/47* (2013.01); *H04N 21/64322* (2013.01); *G08C 2201/92* (2013.01); *G08C 2201/93* (2013.01); *H04N 21/42221* (2013.01); *H04N 21/42227* (2013.01); *H04N 21/485* (2013.01)

(58) Field of Classification Search
  CPC ............. H04N 21/47; H04N 21/64322; H04N 21/42221; H04N 21/42227; H04N 21/485; G08C 17/02; G08C 2201/92; G08C 2201/93
  USPC .......................................................... 348/734
  See application file for complete search history.

(56) References Cited

U.S. PATENT DOCUMENTS

| | | |
|---|---|---|
| 2006/0013565 A1 | 1/2006 | Baumgartner |
| 2006/0290810 A1 | 12/2006 | Mallinson |
| 2007/0063862 A1 | 3/2007 | Lippincott |
| 2007/0091207 A1 | 4/2007 | Aufranc et al. |
| 2009/0102696 A1* | 4/2009 | Park ........................ G08C 23/04 341/176 |
| 2011/0133885 A1 | 6/2011 | Dai |
| 2011/0164188 A1 | 7/2011 | Karaoguz et al. |
| 2012/0019633 A1 | 1/2012 | Holley |
| 2014/0111318 A1 | 4/2014 | Arling |
| 2014/0222862 A1 | 8/2014 | Arling et al. |
| 2014/0354829 A1 | 12/2014 | Cooper |
| 2015/0035994 A1 | 2/2015 | Son et al. |
| 2016/0150129 A1 | 5/2016 | Kumar et al. |
| 2016/0307439 A1* | 10/2016 | Selfe ...................... G08C 17/02 |
| 2018/0131891 A1 | 5/2018 | Satheesh et al. |

OTHER PUBLICATIONS

International Search Report and Written Opinion received for PCT Patent Application No. PCT/US2017/060913, dated Jan. 5, 2018, 11 pages.

* cited by examiner

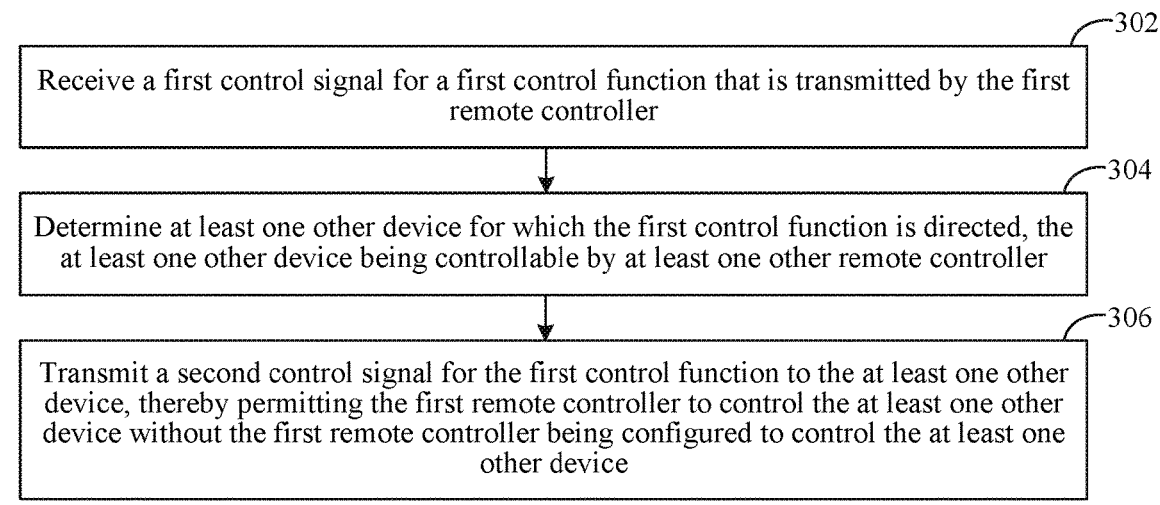
FIG. 3
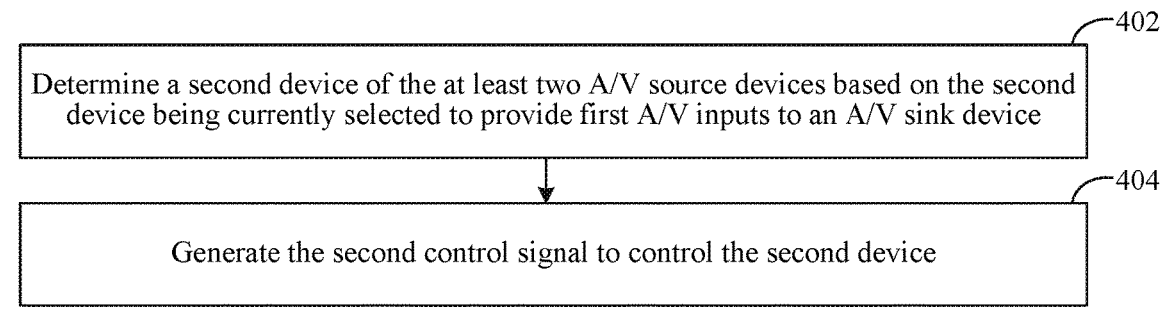
FIG. 4
| SUR Device Table - Table 1 | | | | | | |
|---|---|---|---|---|---|---|
| IP Addr | Device ID | SUR | Protocol | Type | A/V Input | Target |
| N/A | Bluray-ABC123 | Y/N | BT/HDMI | Source | Inactive | |
| Addr 1 | Console-QRS789 | Y/N | IR/IP | Source | Inactive | |
| N/A | STB-DEF237 | Y/N | IR/HDMI | Source | Active | X |
| Addr 2 | TV-XYZ227 | Y/N | IR | Sink | Inactive | |
| ⋮ | | | | | | |
FIG. 5

SOFT UNIVERSAL REMOTE CONTROLLER

CROSS-REFERENCE TO RELATED APPLICATION(S)

The present application is a Continuation of U.S. application Ser. No. 15/808,510, now allowed, entitled "SOFT UNIVERSAL REMOTE CONTROL," filed on Nov. 9, 2017, which claims priority to U.S. Provisional Application Ser. No. 62/420,242, entitled "SOFT UNIVERSAL REMOTE CONTROL," filed on Nov. 10, 2016, the entirety of each of which is incorporated by reference herein.

The present application is related to U.S. application Ser. No. 14/945,175, entitled "SEAMLESS SETUP AND CONTROL FOR HOME ENTERTAINMENT DEVICES AND CONTENT," filed on Nov. 18, 2015, the entirety of which is incorporated by reference herein.

BACKGROUND

I. Technical Field

Embodiments described herein relate to remote controllers.

II. Background Art

High Definition Multimedia Interface (HDMI) is a widely used media interface for audio and video that is frequently present in audio and visual (both "A/V") equipment. A/V sources and sinks generally provide and receive A/V signals, respectively. An HDMI source refers to a device that provides an HDMI signal, such as a digital versatile disc (DVD) or Blu-Ray™ player, or a set-top box (STB). An HDMI sink refers to a device that receives an HDMI signal, such as a television (TV). An HDMI repeater may refer to a device that provides and receives HDMI signals, such as an A/V receiver.

The number of A/V devices (including HDMI devices) utilized in entertainment systems, e.g., in a living room or a media room, continues to increase. Additionally, the complexity of controlling the increasing number of devices is increasing. In current solutions for reducing the complexity in controlling numerous devices, such as A/V and HDMI devices, a handheld universal remote controller device, or the like, may be used by a user to manually switch a mode for an A/V, or HDMI, source or sink device selected from multiple devices that are present.

BRIEF SUMMARY

Methods, systems, and apparatuses are described for a soft universal remote control, substantially as shown in and/or described herein in connection with at least one of the figures, as set forth more completely in the claims.

Methods for a soft universal remote (SUR) controller are performed by systems and apparatuses. Conventionally, each audio/visual (A/V) device is controlled by a respective hardware remote controller that is not configured to control other devices of an audio/visual system. According to methods, systems, and apparatuses, a hardware remote controller configured to control an A/V device, but not other A/V devices, is enabled to control those other A/V devices. In an aspect, a SUR controller implemented by an A/V device provides consumable control signals to such other devices based on control signals received from the A/V device remote controller. The SUR controller determines another device for which a received control function is directed, and transmits to the determined device a generated consumable control signal for the control function, enabling the determined device to perform the control function. Furthermore, user interfaces are provided for the configuration of SUR controllers and remote controllers, and for control of other A/V devices via the user interfaces.

By way of example, a SUR controller is described herein. The SUR controller is implemented in a first device that is controlled by a first remote controller. The first device includes at least one memory configured to store program instructions for SUR operations, and also includes at least one processor configured to access the at least one memory and to execute the program instructions. In embodiments, the program instructions include communication instructions and controller instructions. The communication instructions are configured to receive a first control signal for a first control function that is transmitted by the first remote controller, and the controller instructions are configured to determine another device for which the first control function is directed, the determined device being controllable by at least one other remote controller. The communication instructions are also configured to transmit a second control signal for the first control function to the determined device, thereby permitting the first remote controller to control the determined device without the first remote controller being configured to control the determined device.

By way of further example, a method is described herein. The method may be performed by a SUR controller, in embodiments. The method includes receiving a first control signal for a first control function that is transmitted by a first remote controller that controls a first device, and determining at least one other device for which the first control function is directed, the determined device(s) being controllable by at least one other remote controller. The method also includes transmitting a second control signal for the first control function to the determined device(s), thereby permitting the first remote controller to control the determined device(s) without the first remote controller being configured to control the determined device(s).

By way of another example, a computer-readable storage medium is described herein that has program instructions recorded thereon that, when executed by a processing device, perform a method for a SUR controller, as described herein. In an embodiment, the method includes receiving a first control signal for a first control function that is transmitted by a first remote controller that controls a first device, and determining at least one other device for which the first control function is directed, the determined device(s) being controllable by at least one other remote controller. The method may further include transmitting a second control signal for the first control function to the determined device(s), thereby permitting the first remote controller to control the determined device(s) without the first remote controller being configured to control the determined device(s).

These and other objects, advantages, and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows a flowchart for operations of a SUR controller, according to an example embodiment.

FIG. 4 shows a flowchart for operations of a SUR controller, according to an example embodiment.

FIG. 5 shows a SUR controller device table, according to an example embodiment.

Figure 1A:
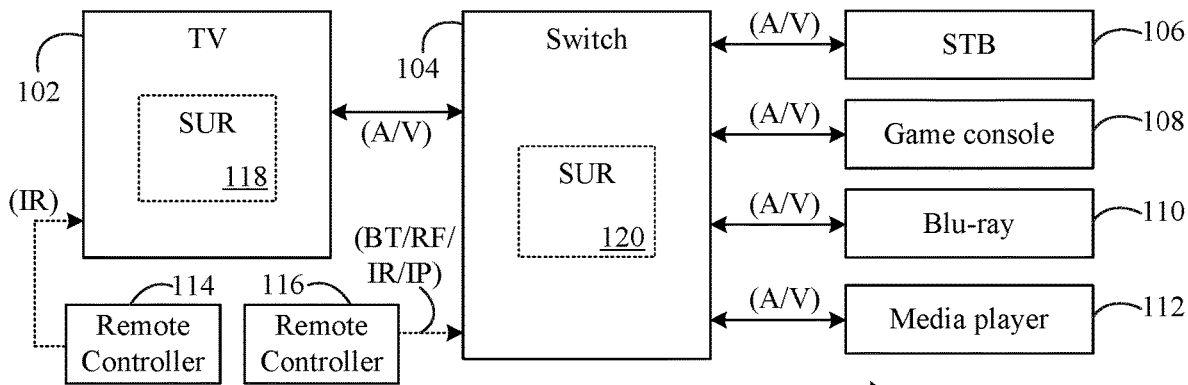
FIG. 1A shows a block diagram of an example entertainment system using soft universal remote (SUR) controllers, according to an example embodiment.

Disclosed subject matter will now be described with reference to examples, including examples shown in accompanying drawings. Each drawing shows a distinct example unless express indicated otherwise. Like reference numbers may indicate identical or functionally similar elements. The left-most digit(s) of a reference number (e.g., a series) may identify the number of a figure in which the reference number appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "embodiment," "example," "example embodiment," etc. indicate that an embodiment/example may include one or more described features, structures, characteristics, procedural steps, etc., but examples/embodiments are not required to include the described features, structures, characteristics, procedural steps, etc. described in examples. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

For example, the techniques and embodiments described herein may be adapted to various types of systems and devices, for example but without limitation, communication devices (e.g., cellular and smart phones, etc.), computers/computing devices (e.g., laptops, tablets, desktops, etc.), computing systems, electronic devices, gaming consoles, home electronics and entertainment devices (e.g., home theater systems, stereos, televisions, media players, set top boxes, DVD players, etc.), High Definition Multimedia Interface (HDMI) switches, repeaters, and/or the like. It is contemplated herein that in various embodiments and with respect to the illustrated figures of this disclosure, one or more components described and/or shown may not be included and that additional components may be included.

The techniques and embodiments described herein provide capabilities to use any remote controller for any device in an entertainment system, e.g., a living room or media room entertainment system, enabling each remote controller to effectively operate as a universal remote controller. Embodiments for a soft universal remote (SUR) controller utilize software executing on hardware, and/or specialized hardware, in audio/visual (e.g., audio/video), or "A/V", devices including both source devices and sink devices.

For example, many A/V devices are controlled by remote controllers with one or more protocol types, such as but not limited to, infrared (IR), internet protocol (IP) (e.g., via wireless/wired network), radio frequency (RF), HDMI-consumer electronics control (CEC), Bluetooth®, etc. A remote controller may provide control signals to its associated A/V device to control the A/V device according to one or more control functions. In one example scenario, a remote controller for a television (TV) may provide control signals for control functions like volume, menu, input selection, and/or the like. Extending this example scenario, a set-top box (STB) may be communicatively coupled to the TV to provide A/V inputs thereto, e.g., via an HDMI connection, a component interface connection, a coaxial interface connection, etc. According to the SUR controller embodiments and techniques, the TV remote controller may be used to cause control signals for control functions to be sent to the STB, e.g., via a SUR controller at the TV, even though the TV remote controller is not configured to control the STB. Similarly, other A/V devices in the entertainment system may also be controlled via the SUR, such as but without limitation, a game console, a Blu-Ray™ player, a streaming or storage-based media player, etc.

In embodiments, multiple A/V devices may each include an instance of the described SUR controller, and such instances may be configured to communicate with each other, and cooperatively, or individually, provide control of the multiple A/V devices through the use of any physical remote controller of any of these devices. Furthermore, both source and sink A/V devices may implement the SUR controller techniques described in the embodiments herein. That is, the remote controller of an A/V sink device may be used via the SUR controller to control other A/V sink devices as well as A/V source devices, and an A/V source device may be used via the SUR controller to control other A/V source devices as well as A/V sink devices.

A SUR controller may subscribe to one or more (e.g., any and/or all) operations of a device-specific remote controller (e.g., media player remote control) for the A/V device (e.g., the media player). A SUR controller may discover or otherwise identify devices that may be connected to inputs of an A/V sink device. A SUR controller may create and update (maintain) a map of connected A/V source devices to respective inputs of the A/V sink device using a device table, described in further detail below. A SUR controller may also identify connected devices, for example, based on input provided by a user using a user interface to the SUR controller. In embodiments, a user may be prompted to enter connected device information, for example, when the SUR controller is unable to identify a connected device.

An A/V device remote controller may continue to control the A/V device while a SUR controller on the A/V device also assists with controlling other connected A/V devices using the hardware remote controller of the A/V device. A SUR controller may determine one or more types of control signals (e.g., Bluetooth®, IR, IP, HDMI-CEC, etc.) that may be used to control the one or more connected devices.

A SUR controller may receive A/V device remote controller signals such as by tapping remote operations (e.g., via a communication interface or device controller). In an example, a SUR controller may determine (e.g., unilaterally or with user input) which device (e.g., TV and/or connected devices) may be controlled by TV remote controller signals, potentially excluding one or more operations, such as TV input select and TV menu operations. A SUR controller may maintain record of a current active A/V device (e.g., Blu-Ray™ player, media player, STB, game console, etc.) providing input to an A/V sink device (e.g., a TV). This information may be received, for example, from the A/V sink device or a user, or by the SUR controller detecting hardware remote controller signals. This information may indicate which connected device is active (e.g., the current A/V input device or source), to determine which device the SUR controller may control at any given time using the hardware remote controller of the device.

A SUR controller may forward/pass and/or map control operations received from a hardware remote controller by an A/V device to an active-input A/V device (which may be the A/V device or another A/V device). That is, a SUR controller may map control signals received by a source device from a source remote controller in a format or communication type (e.g., IR) to one or more signals in the same and/or other communication type (e.g., Bluetooth® (BT), IR, IP, HDMI-CEC) for one or more other A/V source or sink devices.

Buttons on an A/V device remote controller (e.g., number keys, play, stop, pause, fast forward (FFW), rewind (RWD), next, previous, menu, up-down-right-left and select buttons, input, programmable buttons, voice control, etc.) may be used to control connected devices in addition to the A/V device itself, for example, based on which device may be sourcing A/V content (active input device) to an A/V sink. For example, a voice button may be tapped by a SUR controller to provide a customized (e.g., concurrent/simultaneous) search that may cover content and operations across multiple (e.g., all) connected devices.

In embodiments, a SUR controller may provide a pop-up menu (e.g., a graphical user interface or GUI) on an A/V sink device for which a user may use the hardware remote controller of the A/V sink device to select/activate a connected device and/or to select controls displayed on the A/V sink for one or more connected devices.

In embodiments, one or more buttons on an A/V sink device (e.g., a TV) remote controller may be mapped to select the SUR controller, which may display the GUI menu to provide SUR controller configuration options. Additionally, other functionalities may be provided such as but not limited to watch lists (e.g., for content provided by one or more content providers such as Netflix® available on one or more of the sources or connected devices).

One or more SUR controller operations may involve changing an active source input device of an A/V sink device (e.g., TV). This may be performed using an A/V source device remote controller, for example, by using a programmable or other button on the A/V source device remote controller to cause the SUR controller to generate a SUR controller GUI (e.g., on the A/V sink device). The GUI may display the configured A/V source devices and permit a user to select a source input device for the A/V sink device. In an example scenario where a current/active device is not the source device executing the SUR controller, the SUR controller may change the A/V sink device active input to the source device executing the SUR controller to display the GUI. In an alternate example, a voice button of the A/V source device remote controller may be tapped by a SUR controller to provide a source-switch feature.

The term "Soft Universal Remote" (SUR) may be used herein to refer to hardware that executes one or both of software or firmware according to embodiments and techniques, although it should be appreciated the custom or specialized hardware solutions performing the same or similar functions and operations are also contemplated herein, enabling existing remote controllers to control more A/V devices than originally designed/configured for. Various embodiments are described herein with respect to HDMI enabled devices as examples for illustration and discussion, but embodiments herein are not so limited, and any type of connection/communication protocol is contemplated herein for devices embodying or controlled by SUR controllers. That is, although some examples refer to HDMI devices, the subject matter may be used to render SUR controllers for devices with other interfaces (e.g., USB) as SUR controllers.

Figure 1B:
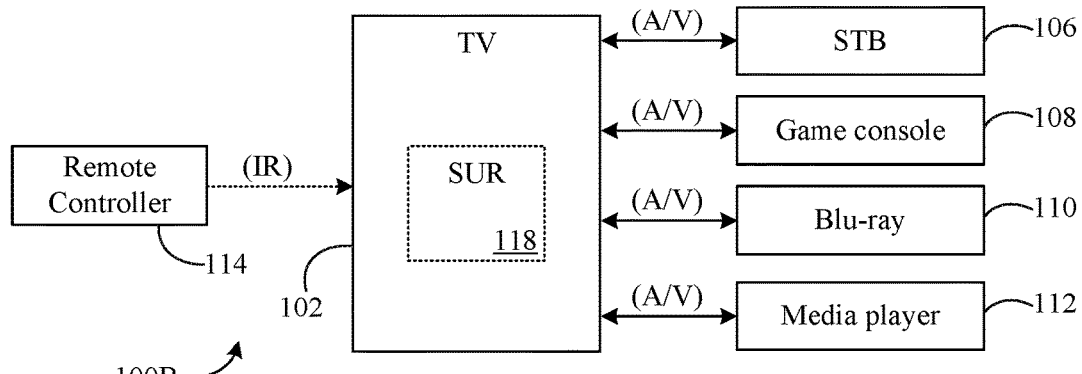
FIG. 1B shows a block diagram of an example entertainment system using a SUR controller, according to an example embodiment.

Accordingly, systems, apparatuses, and devices may be configured and enabled in various ways for providing SUR controller functions. For example, FIG. 1A is a block diagram of an example entertainment system 100A that includes multiple SUR controllers, according to an embodiment. FIG. 1B is a block diagram of an example entertainment system 100B that includes a SUR controller, according to an embodiment. FIGS. 1A and 1B are described as follows.

System 100A of FIG. 1A includes a switch 104 communicatively coupled with one or more A/V sources and/or A/V sinks including a television (TV) 102, a set-top box (STB) 106, a game console 108, a Blu-Ray™ player 110, and a media player 112. As shown, STB 106, game console 108, Blu-Ray™ player 110, and media player 112 are A/V sources and are coupled to TV 102, which is an A/V sink, via switch 104. TV 102 is controlled by a remote controller 114 (e.g., an infrared (IR) remote controller), and switch 104 is controlled by a remote controller 116 (which may be a Bluetooth® (BT), IR, Internet Protocol (IP), radio frequency (RF), or HDMI Consumer Electronics Control (HDMI-CEC) remote controller, etc.). Remote controller 114 may not be configured to control the A/V source devices and switch 102, and remote controller 116 may not be configured to control the A/V source devices and TV.

In embodiments, the A/V sources and A/V sink may be HDMI-enabled devices and switch 104 may be an HDMI switch. In such embodiments, a SUR controller 118 executing on TV 102, or a SUR controller 120 executing on switch 104, may control each A/V source and sink device using the HDMI-CEC protocol over HMDI connections, such as HDMI cables, based on control signals received from either of remote controller 114 and/or remote controller 116, as described in further detail below.

With reference to FIG. 1B, system 100B includes TV 102 having SUR controller 118, STB 106, game console 108, Blu-Ray™ player 110, and media player 112. STB 106, game console 108, Blu-Ray™ player 110, and media player 112 (A/V sources) are connected to TV 102 (no intermediate switch is present). That is, in embodiments, an A/V source(s) may be connected directly (in a wired or wireless manner) to an A/V sink device. As noted above, TV 102 is controlled by remote controller 114 (e.g., an infrared (IR) remote controller) not configured to control the A/V source devices of system 100B.

In each of system 100A and system 100B, TV 102 may be any type from any manufacturer. While a TV is illustrated and described, other types of A/V sinks, such as projection displays, monitors, etc., are contemplated herein. Likewise, STB 106, game console 108, Blu-Ray™ player 110, and media player 112 may be any respective type of device. For instance, game console 108 may be an Xbox®, a Sony P54®, or other type of game console. Media player 112 may be an Apple TV®, Roku®, or other type of media player. An A/V sink device such as TV 102 may be coupled to multiple devices, including source devices, by the same or different inputs/interfaces, such as Ethernet, HDMI, component, composite, coaxial, etc., as well as wireless interfaces for wireless networks, IR blaster and/or IR receiver interfaces, etc.

According to embodiments, one or more A/V devices may execute one or more instances of a SUR controller program (e.g., as in SUR controller 118 and/or SUR controller 120), such as in the form of computer executable instructions (stored in a memory and executed by one or more processors) that render one or more remote controls for one or more of these A/V devices as SUR controller controls, permitting a device remote controller to control one or more other devices the remote controller may not have been manufactured or configured to control. For instance, in FIG. 1A, although TV 102 is shown including SUR 118, and switch 104 is shown including SUR 120, any one or more of TV 102, switch 104, STB 106, game console 108, Blu-Ray™ player 110, media player 112, remote controller 114, and/or remote controller 116 may each include a corresponding SUR.

An entertainment system may have any number of High Definition Multimedia Interface (HDMI) and/or A/V devices, including greater numbers or fewer numbers than shown in FIGS. 1A and 1B. HDMI and A/V devices may be controlled, for example, by one or more types of control signals transmitted/received using one or more types of communication, such as Bluetooth® (BT), infrared (IR), Internet Protocol (IP), radio frequency (RF), HDMI Consumer Electronics Control (HDMI-CEC), etc. Control signals may be provided by hardware remote controllers, which may provide control signals with or without a physical connection (e.g., wired, wireless).

As mentioned above, frequently each A/V device has its own remote controller. Controlling multiple A/V devices with multiple remote controllers to watch and/or listen to A/V content sourced from different devices is inconvenient. Such inconvenience is reduced by using one or more SUR controllers (e.g., SUR controller 118, SUR controller 120, etc.) as described herein. SUR controllers simplify setup and operation of an entertainment system having a variety of devices and remote controllers. Such embodiments enable control of multiple A/V devices without the presence of a universal remote control (although one may be optionally present).

In embodiments, remote controls for multiple controlled A/V devices may each be effectively turned into universal remote controllers by the inclusion of one or more SUR controllers in the media system. The SUR controllers may provide functionality for the remote controllers or controlled A/V devices that is not already present, and/or that resides in a different remote controller or A/V device. As described herein, one or more SUR controllers may be created, for example, by modifying or adding software on one or more controlled A/V devices or hardware remote controllers, and/or by connecting compatible hardware to one or more controlled A/V devices.

Figure 2:
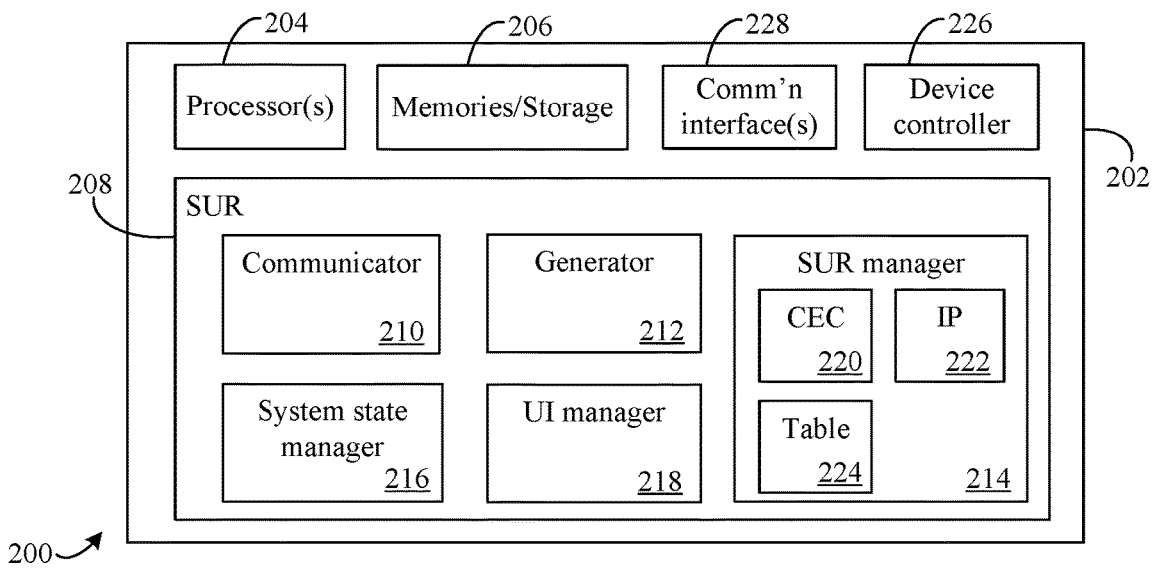
FIG. 2 shows a block diagram of an example SUR controller implemented in a system, according to an example embodiment.

As noted above, systems, apparatuses, and devices may be configured and enabled in various ways for providing SUR controller functions. For instance, a SUR controller, such as SUR controller 118, may be configured to receive control signals from a hardware remote controller of an A/V device executing an instance of the SUR controller and then provide specific control signals to other devices for control functions even while the hardware remote controller is not configured to control the other devices. FIGS. 2, 3, and 4 are described in this context as follows.

FIG. 2 shows a block diagram of an example SUR controller 208 implemented in a media system 200, according to an embodiment. System 200 is a further embodiment of any A/V device of system 100A of FIG. 1A and/or of system 100B of FIG. 1B. As shown in FIG. 2, system 200 includes an A/V device 202 which may be an A/V source, an A/V sink, or an A/V switch.

As shown in FIG. 2, A/V device 202 includes one or more of a processor ("processor") 204, one or more of a memory and/or other physical storage device ("memory") 206, a communication interface(s) 228, a device controller 226, and a SUR controller 208. SUR controller 208 is an example embodiment of SUR controller 118 and/or SUR controller 120 of FIGS. 1A and 1B. A/V device 202 may also include additional components (not shown for brevity and illustrative clarity) including, but not limited to, components and subcomponents of other systems herein, as well as those described below with respect to FIG. 12, e.g., an operating system, etc.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of SUR controller 208, e.g., as computer program instructions/logic for SUR controller functions, as described herein. Memory 206 is configured to store such computer program instructions/logic, as well as to store other information and data described in this disclosure including, without limitation, SUR controller devices tables, etc., as described below.

Communication interface 228 may include one or more (wired and/or wireless) interfaces, such as but not limited to, a network interface, a Bluetooth® interface, an IR interface, an RF interface, an HDMI interface(s) (e.g., HDMI input/output (I/O) ports, configurable I/O ports, etc.), and/or the like for network and/or hardware remote controller communications. A network interface may be any type of wired and/or wireless network adapter, modem, etc., configured to enable A/V device 202 to communicate with other devices over a network, such as communications between A/V device 202 and other devices utilized in an entertainment system over a network, such as a home network, the Internet, etc. An IR interface may include receive and transmit portions, and also may include an adapter or connector for an external IR transmitter such as an IR blaster.

Device controller 226 may include hardware, firmware, and/or software configured to cause A/V device 202 to operate and function according to its intended purpose. For example, device controller 226 may be provided by the manufacturer of A/V device 202 to control operations thereof, including handling of control signals from an associated hardware remote controller of A/V device 202.

SUR controller 208 includes a plurality of components for performing the techniques described herein for SUR controllers. As shown, SUR controller 208 includes a communicator 210, a generator 212, a SUR manager 214, a system state manager 216, and a UI manager 218. SUR manager 214 includes a CEC detector 220, an IP detector 222, and a SUR device table 224 (described in further detail with respect to FIG. 5 below). While shown separately for illustrative clarity, in embodiments, one or more of communicator 210, generator 212, SUR manager 214, system state manager 216, and/or UI manager 218 may be included together with each other and/or as a part of other components of system 200.

FIG. 3 shows a flowchart 300 for operations of a SUR controller, according to an embodiment. In embodiments, flowchart 300 may be performed by an A/V device as described herein, such as A/V device 202. For purposes of illustration, flowchart 300 is described with respect to system 200 of FIG. 2, as well as system 100A of FIG. 1A and system 100B of FIG. 1B. Further structural and operational examples will be apparent to persons skilled in the relevant art(s) based on the following description. Flowchart 300 is described as follows.

Flowchart 300 begins at step 302. In step 302, a first control signal for a first control function that is transmitted by the first remote controller is received. For instance, communicator 210 of A/V device 202 in FIG. 2 may be configured to receive control signals from a hardware remote controller of A/V device 202. Communicator 210 may include one or more software-level communication protocol implementations configured to receive control signals from the hardware remote controller irrespective of the type of communication protocol used (e.g., Bluetooth®, IR, IP, RF, HDMI-CEC, and/or the like). In embodiments, communicator 210 may reside above communication interface 228 in a communication stack and receive control signals therefrom.

In step 304, at least one other device is determined for which the first control function is directed, the at least one other device being controllable by at least one other remote controller. For example, SUR manager 214 may be configured to determine another device (other than A/V device 202) for which the control function of the control signal of step 302 is directed. For example, in FIG. 1B, a user may be watching TV 102 (as A/V device 202 in this example) using STB 106 as the selected A/V source device. If the user used remote controller 114 of TV 102 to change channel, communicator 210 receives the control signal from remote controller 114. SUR manager 214 determines that STB 106 is the selected A/V source device, and therefore determines the control signal from remote controller 114 is intended to perform a control function of changing the channel being watched on STB 106.

In step 306, a second control signal for the first control function is transmitted to the at least one other device, thereby permitting the first remote controller to control the at least one other device without the first remote controller being configured to control the at least one other device. For instance, communicator 210 of A/V device 202 may be configured to transmit control signals for the control function described in steps 302 and 304 to an A/V device other than A/V device 202. Referring again to the previous example scenario referencing STB 106 of system 100B in FIG. 1B, SUR manager 214 determines that STB 106 is the selected A/V source device (in step 304), and generates a second control signal transmitted to STB 106 in a communication protocol that can be consumed by STB 106. STB 106 changes the channel as desired by the user operating the remote controller of step 302.

Accordingly, the user is enabled to change channels on STB 106 using remote controller 114 of TV 112, even though remote controller 114 itself is not designed/configured to control STB 106. STB 106 may have its own hardware remote controller normally used for changing its channel setting.

A SUR controller may determine the second device and corresponding second control signal in various ways. For instance, FIG. 4 shows a flowchart 400 for operations of a SUR controller, according to an embodiment. Flowchart 400 may be performed by A/V device 202, in an embodiment. Flowchart 400 is an example of step 304 of flowchart 300 (FIG. 3). Flowchart 400 is described as follows.

Flowchart 400 begins at step 402. In step 402, a second device of the at least two A/V source devices is determined based on the second device being currently selected to provide first A/V inputs to an A/V sink device. For instance, SUR controller 208 of FIG. 2 may be configured to determine which A/V device is currently selected (e.g., active) to provide A/V inputs to an A/V sink device, such as TV 102. In an embodiment, SUR controller 208 may make this determination based on a SUR device table 228, as described in further detail below with respect to FIG. 5. SUR device table 228 is a data structure that may be stored persistently or otherwise by memory 206.

In step 404, the second control signal is generated to control the second device. For example, SUR controller 208 via generator 212 may generate the second control signal based on the first control signal (of step 302 of FIG. 3), the type of the second device, and/or the type of protocol used to control the second device. For instance, a TV remote controller using IR transmission can provide a channel change control function in a first control signal that is received by the TV, and a SUR controller at the TV may generate a second control signal (e.g., as an IR or HDMI signal) that includes the command for the control function for transmitting to a STB via HDMI or other protocol to change the channel.

FIG. 5 shows a SUR controller device table 500, according to an embodiment. Device table 500 is an example of SUR device table 224 of FIG. 2. Device table 500 may list any number of characteristics or attributes of A/V devices as described herein. Such characteristics or attributes may be utilized by a SUR controller to determine A/V devices to be controlled via the SUR controller and/or to generate control signals for an A/V device to be controlled (e.g., the second control signal of step 404 in flowchart 400 described above). Each A/V device may include a SUR controller, and each SUR controller instance may maintain an instance of device table 500. Each instance of device table 500 may be updated and synchronized across A/V devices via a network, using HDMI communications, etc.

As shown in FIG. 5, device table 500 may include for each listed device a device identifier (ID), an IP address, a SUR presence, a device control protocol type, an A/V device type (e.g., source/sink), and A/V input status, and/or a control target status. Device IDs for devices may be determined automatically using HDMI functionality and/or via SUR controller setup (e.g., using a GUI) as described below (and shown listed in a "Device ID" column). A/V devices may or may not be IP capable, and in cases where an A/V device is IP capable, SUR manager 214 of FIG. 2 may determine the IP address of the A/V device via IP detector 222 by sniffing or monitoring network connections therefor (and shown listed in an "IP Addr" column). As noted above, any A/V device in a system may include an instance of a SUR controller, and whether or not a given A/V device includes such an instance may be indicated in device table 500 (e.g., a Y or N in the "SUR" column).

Additionally, the type of protocol(s) for which an A/V device is configured to receive control signals may be indicated in device table 500. For example, indications of IR, BT, IP, HDMI, etc., may be indicated in a "Protocol" column. The device type may also be designated as a source/sink. In some cases, e.g., for A/V repeaters including HDMI switches, both types of device may be indicated (e.g., in a "Type" column). Device table 500 may also include indicia of A/V input status (in an "A/V Input" column). For instance, an A/V source may be actively providing A/V inputs to a sink device, or may be inactive. In some cases, an A/V sink device in a menu navigation mode of operation may be designated as active. Device table 500 may further include an express indication of which A/V device therein is the target (i.e., is selected) to be controlled via the SUR controller (e.g., in a "Target" column). A target attribute may be determined by IP detector 222, CEC detector 220, and/or by monitoring for an active input port of an A/V sink device on which an instance of a SUR controller is executing.

A/V devices may be added and/or removed from media systems as described herein, and accordingly, SUR controller instances are configured to dynamically update their respective device tables when devices are added or removed.

Figure 6:
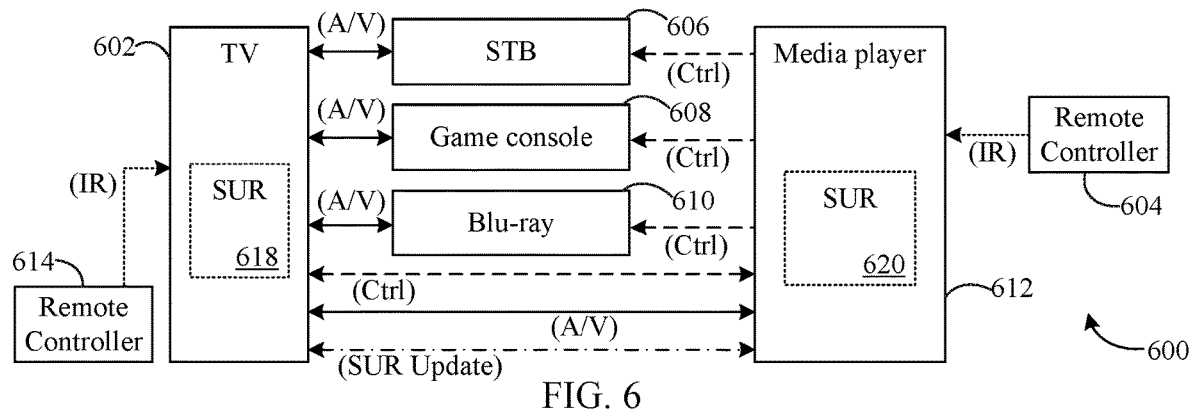
FIG. 6 shows a block diagram of an example entertainment system using a SUR controller, according to an example embodiment.

FIG. 6 shows a block diagram of an example entertainment system 600 that includes SUR controllers, according to an embodiment. System 600 includes a TV 602 having a SUR controller 618, a STB 606, a game console 608, a Blu-Ray™ player 610, and a media player 612 having a SUR controller 620. STB 606, game console 608, Blu-Ray™ player 610, and media player 612 (A/V sources) are connected to TV 602 without an intermediary switch. TV 602 and media player 612 may be respectively controlled by remote controller 614 and remote controller 604, each of which are configured to control their respective A/V device while not being configured to control other A/V devices of system 600.

System 600 is an embodiment of system 100B of FIG. 1B, with the addition of SUR controller 620 and remote controller 604 for media player 612. SUR controller 620 is an embodiment of SUR controller 208 of FIG. 2, such that SUR controller 620 executes on media player 612, an A/V source device. Accordingly, SUR controller 620 may be used to control one or more of TV 102, STB 106, game console 608, and/or Blu-Ray™ player 610 via remote controller 604, according to the SUR controller embodiments described herein. In FIG. 6, TV 602 and media player 612 each include a respective SUR controller instance, and may operate according to flowchart 300 of FIG. 3 and flowchart 400 of FIG. 4.

As shown in FIG. 6, A/V sink and source devices are communicatively coupled by A/V connections or connectors (e.g., cables, wireless connections, etc.) that transmit A/V signals. System 600 also shows connections or connectors for transmitting control ("Ctrl") signals from A/V devices that implement SUR controllers. In embodiments, control signal connections or connectors may be implemented in, or as, A/V connections or connectors. For instance, HDMI control signals may be provided via HDMI connections or connectors using CEC commands. In an example scenario, a control signal may be transmitted from remote controller 604 of media player 612 to increase the volume on TV 102 (e.g., according to flowchart 300 of FIG. 3 and/or flowchart 400 of FIG. 4). Media player 612 transmits the control signal to TV 102 via an HDMI connection between them. In some embodiments, the volume control signal may be instead passed to STB 606 because STB 606 is designated as the active or target A/V device, and STB 606 in turn provides the volume control signal to TV 602.

Likewise, a control signal from remote controller 604 of media player 612 to change the channel displayed on TV 102 by STB 606 (when STB 606 is designated as the active or target A/V device) may be provided from media player 612 to TV 102 via the same HDMI connection, and then provided from TV 602 to STB 606 via the HDMI connection between them. In another embodiment, media player 612 may provide a control signal directly to STB 606 via any connection therebetween, e.g., IR, IP, etc.

Additionally, IR, IP, BT, etc., connections or connectors may be used to provide control signals between A/V devices.

Note that each instance of device table 500 (FIG. 5) (e.g., in devices implementing a SUR controller) may be updated when the designated active or target A/V device is changed. That is, when the active A/V source selected to provide A/V inputs to an A/V sink device is changed, each instance of device table 500 is updated.

Figure 7:
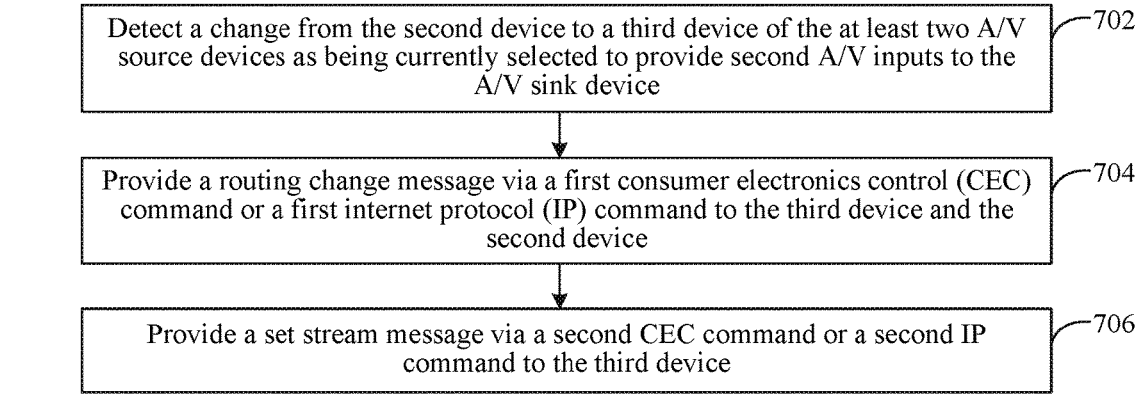
FIG. 7 shows a flowchart for operations of a SUR controller, according to an example embodiment.

For instance, FIG. 7 shows a flowchart 700 for operations of a SUR controller according to an embodiment. Flowchart 700 is an embodiment of flowchart 300 of FIG. 3 (step 304). Flowchart 700 may be performed by A/V device 202, TV 602, media player 612, or another A/D device. For purposes of illustration, flowchart 700 of FIG. 7 is described with respect to device table 500 of FIG. 5 and to system 600 of FIG. 6. Flowchart 700 is described as follows. Further structural and operational examples will be apparent to persons skilled in the relevant art(s) based on the following description.

Flowchart 700 begins at step 702. In step 702, a change is detected from the second device to a third device of the at least two A/V source devices as being currently selected to provide second A/V inputs to the A/V sink device. For instance, a user of TV 602 may be consuming content via media player 612, such that media player 612 is actively providing A/V inputs to TV 602. If the user changes the A/V input selection on TV 602 to watch a program via STB 606, then STB 606 actively provides A/V inputs to TV 602. SUR controller 618 may be configured to detect the change in the active A/V sink device by monitoring/receiving this information from TV 602, by monitoring HDMI signaling (e.g., CEC), and/or by monitoring IP network activity, as described herein, by IP detector 222, CEC detector 220, device controller 226, etc.

In step 704, a routing change message is provided via a first consumer electronics control (CEC) command or a first internet protocol (IP) command to the third device and the second device. For instance, a SUR controller instance implemented on an A/V device having a remote controller may be designated as a "master" instance, while any other instances are "slave" instances. Each SUR controller instance may be configured to perform step 704, and in embodiments, the master SUR controller instance provides the routing change message. The routing change message provides an indication to all SUR controller instances that a newly selected A/V device has been identified as providing A/V inputs for an A/V sink device. Upon receipt of the routing change message, each SUR controller instance is configured to update its device table 500.

Continuing the example, when STB 606 is selected to actively provide A/V inputs to TV 602, a routing change message is generated and transmitted from SUR controller 618 of TV 602 to SUR controller 620 of media player 612. TV 602 is configured to update its own device table temporally proximate to the sending of the routing change message, and media player 612 is configured to update its own device table subsequent to receipt of the routing change message.

In step 706, a set stream message is provided via a second CEC command or a second IP command to the third device. For example, continuing the scenario from above, SUR controller 618 is configured to provide the set stream message to STB 606 thus notifying STB 606 that is now allowed to provide its A/V inputs to TV 602. SUR controller 618 may provide the set stream message, or an equivalent message, by utilizing CEC detector 220 or IP detector 222.

Figure 8:
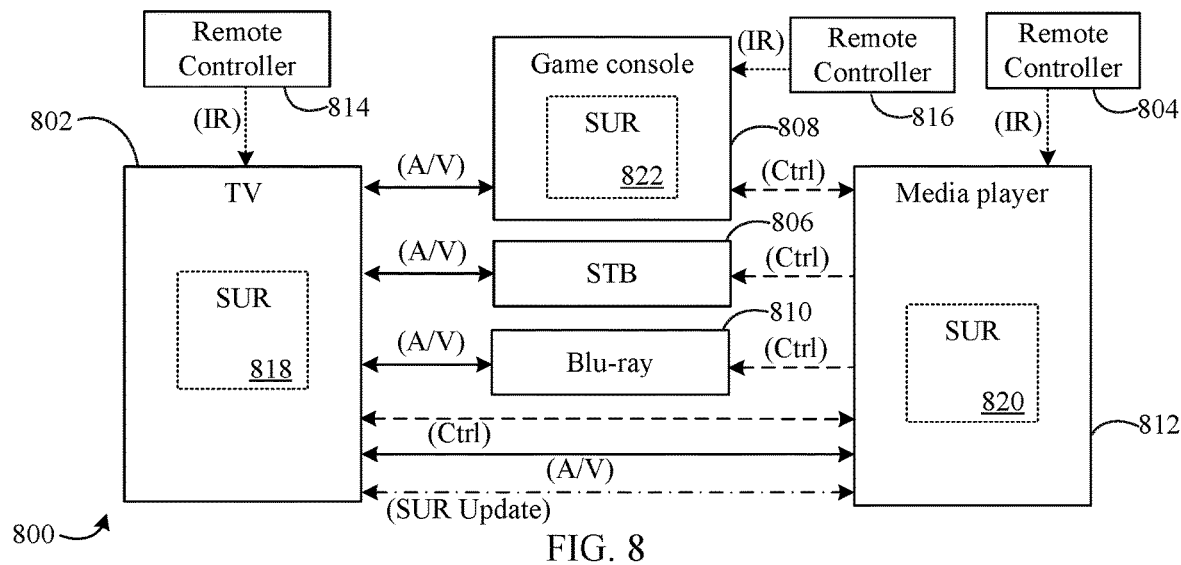
FIG. 8 shows a block diagram of an example of a SUR controller distributed over multiple devices, according to an example embodiment.

FIG. 8 shows a block diagram of an example entertainment system 800 that includes SUR controllers, according to an embodiment. System 800 includes a TV 802 having a SUR controller 818, a STB 806, a game console 808 having a SUR controller 822, a Blu-Ray™ player 810, and a media player 812 having a SUR controller 820. As shown, STB 806, game console 808, Blu-Ray™ player 810, and media player 812 (A/V sources) are connected to TV 802 without an intermediate switch. TV 802, game console 808, and media player 812 may be respectively controlled by a remote controller 814, a remote controller 816, and a remote controller 804, each of which are configured to control their respective A/V devices while not being configured to control other A/V devices of system 800.

System 800 is a further embodiment of system 100B of FIG. 1B and/or system 600 of FIG. 6 with the addition of SUR controller 822 and remote controller 816 for game console 808. SUR controller 620 is an embodiment of SUR controller 208 of FIG. 2. SUR controller 620 executes on media player 612, an A/V source device. Accordingly, SUR controller 620 may be used to control one or more of TV 102, STB 106, game console 608, and/or Blu-Ray™ player 610 via remote controller 604 by the SUR controller embodiments described herein. TV 602 and media player 612, each having a respective SUR controller instance, may each operate according to flowchart 300 of FIG. 3 and flowchart 400 of FIG. 4.

Similar to system 600 of FIG. 6, system 800 includes A/V sink and source devices communicatively coupled by A/V connections or connectors for transmitting/receiving A/V signals, and shows connections or connectors for providing/receiving control ("Ctrl") signals from A/V devices that implement SUR controllers. In an example scenario, a control signal may be transmitted by remote controller 804 of media player 812 to control functions of any other A/V device of system 800 (e.g., according to flowchart 300 of FIG. 3 and/or flowchart 400 of FIG. 4). Similarly, control signals may be provided from remote controller 814 of TV 802 and/or from remote controller 816 of game console 808 to control other functions of any other A/V device of system 800.

In other words, SUR controller functionality may be distributed over multiple devices by way of multiple SUR controller instances. In this manner, multiple instances of a SUR controller enables multiple universal remote controllers via these SUR controller instances, thereby allowing a user to pick up any one of multiple, separate remote controllers, each of which are enabled to control multiple, separate A/V devices. Therefore, the hardware remote controllers provide multi-A/V device control. In embodiments, each instance of a SUR controller may be a whole or a part of an overall SUR controller application. A SUR controller instance installed on one A/V device may vary from other SUR controller instances, based on the particular device upon which it is installed. That is, a SUR controller instance may be adapted to the type of device upon which it is installed. For example, a source device component in a SUR controller may be implemented on a source device while a sink device component may be implemented on a sink device, in embodiments.

In an embodiment, a SUR controller may provide a pop-up menu (e.g., a GUI) by which a user may utilize an A/V device remote controller to select controls for one or more devices. One or more buttons on an A/V device remote controller may be mapped to select a SUR controller, which may display a GUI menu to provide SUR controller configurations and operational options.

Figure 9:
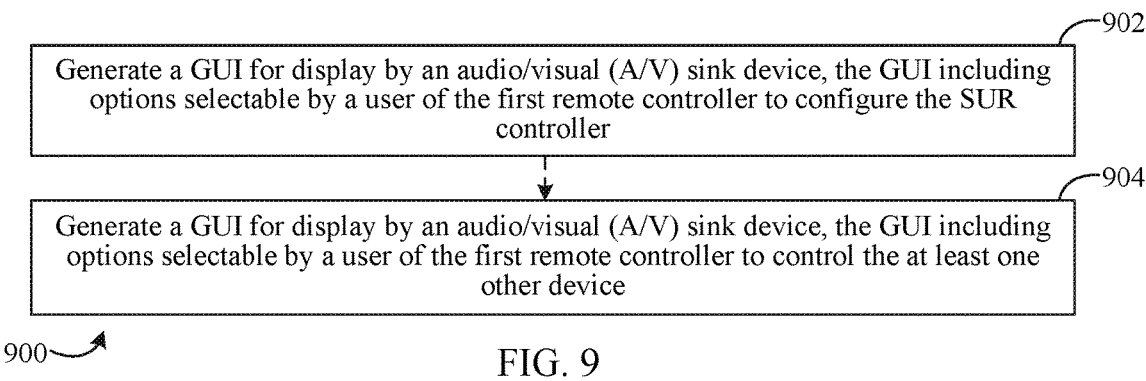
FIG. 9 shows a flowchart for operations of a SUR controller, according to an example embodiment.
Figure 10:
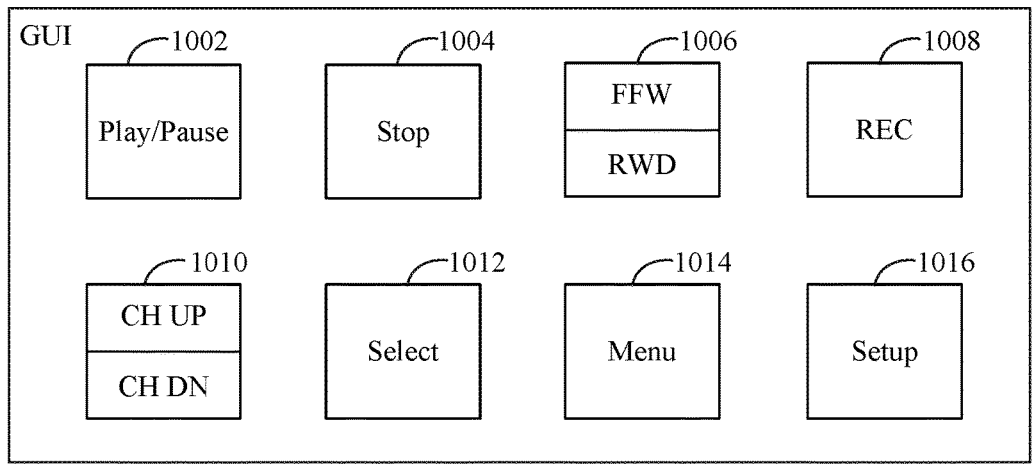
FIG. 10 shows a graphical user interface for a SUR controller, according to an example embodiment.

For example, FIGS. 9 and 10 are now described. FIG. 9 shows a flowchart 900 for operations of a SUR controller, according to an embodiment. Flowchart 900 may be performed by an A/V device as described herein, such as A/V device 202 of FIG. 2. Further structural and operational examples will be apparent to persons skilled in the relevant art(s) based on the following description. In embodiments, one or both steps of flowchart 900 may be performed, either alternatively, sequentially, or in conjunction.

FIG. 10 shows a graphical user interface (GUI) 1000 for a SUR controller, according to an embodiment. GUI 1000 is exemplary in nature and should be considered for illustrative purposes and discussion. The options and configuration of GUI 1000 are not to be considered limiting, and additional, or fewer, options are contemplated herein, as are alternate configurations, as would be apparent to one of ordinary skill in the relevant art(s) having the benefit of this disclosure. A user may navigate GUI 1000 using one or more buttons on a remote controller of an A/V device such as arrow buttons, select/enter buttons, and/or the like, by voice, and/or in any other suitable manner. Flowchart 900 is described as follows with respect to GUI 1000 and system 200 of FIG. 2.

Flowchart 900 begins at step 902. In step 902, a GUI is generated for display by an A/V sink device, the GUI including options selectable by a user of the first remote controller to configure the SUR controller. For example, UI manager 218 of SUR controller 208 may be configured to generate a GUI for display by an A/V sink device. In embodiments, GUI 1000 may be displayed according to UI manager 218. As shown, GUI 1000 includes options selectable by a user of the first remote controller to configure the SUR controller, including but without limitation, a setup option 1016. As noted above, one or more buttons on an A/V sink device remote controller may be mapped to select the SUR controller, which may display the GUI menu to provide SUR controller configuration options. Additionally, other functionalities may be provided such as but not limited to watch lists (e.g., for content provided by one or more content providers such as Netflix® available on one or more of the sources or connected devices). Furthermore, one or more entries of a SUR device table (e.g., device table 500 of FIG. 5) may be configured via setup option 1016.

Setup option 1016 may provide capabilities for a user to map remote controller button combinations (e.g., simultaneous button presses, multiple presses of a single button, etc.) to control functions for different A/V devices. Additionally, setup option 1016 may be displayed automatically to a user when a new A/V device is detected in a system for its configuration for the SUR controller. Setup option 1016 may also provide the user with the ability to manage multiple networks and devices on multiple networks to prevent certain devices from being controlled by a SUR controller.

In step 904, a GUI is generated for display by an A/V sink device, the GUI including options selectable by a user of the first remote controller to control the at least one other device. For example, UI manager 218 of SUR controller 208 may be configured to generate a GUI for display by an A/V sink device. In embodiments, GUI 1000 may be displayed according to UI manager 218. GUI 1000 includes options selectable by a user of the first remote controller to control other A/V devices of a system. In embodiments, the selectable control options include, without limitation, a play/pause option 1002, a stop option 1004, a fast forward/rewind option 1006, a record option 1008, a channel option 1010, a select option 1012, and a device menu option 1014 (although additional control options are contemplated herein).

By providing such options to the user for control of other A/V devices in a system, GUI 1000 allows a user of even the most basic types of remote controllers (e.g., those with very few buttons) to control any A/V device using the SUR controller embodiments described herein.

Figure 11:
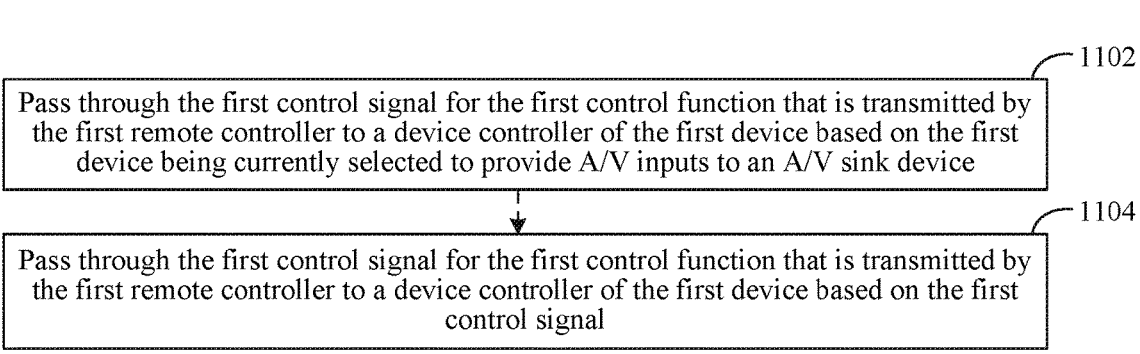
FIG. 11 shows a flowchart for operations of a SUR controller, according to an example embodiment.

FIG. 11 shows a flowchart 1100 for operations of a SUR controller, according to an embodiment. Flowchart 1100 may be performed by an A/V device as described herein, such as A/V device 202 of FIG. 2. For purposes of illustration, flowchart 1100 of FIG. 11 is described with respect to system 200 of FIG. 2. Further structural and operational examples will be apparent to persons skilled in the relevant art(s) based on the following description. In embodiments, one or both steps of flowchart 1100 may be performed, either alternatively, sequentially, or in conjunction. Flowchart 1100 is described as follows.

Flowchart 1100 begins at step 1102. In step 1102, the first control signal for the first control function that is transmitted by the first remote controller is passed through to a device controller of the first device based on the first device being currently selected to provide A/V inputs to an A/V sink device. For example, a first control signal may be received from a first remote controller of an A/V device, as described in step 302 of flowchart 300 in FIG. 3. In embodiments, signals from a remote controller of an A/V device are intended, by the user, to be for the A/V device itself. That is, signals from a remote controller of an A/V device may be directed to changing operations or otherwise interacting with the A/V device rather than being directed to other A/V devices via a SUR controller.

In such cases, a SUR controller such as SUR controller 208 of FIG. 2 is configured to pass the control signals received from an A/V device's remote controller through for consumption by the device for various device-specific operations (e.g., by device controller 226). For example, system state manager 216 may be configured to monitor when the A/V device is operating in a mode such that the A/V device itself is providing A/V inputs for display (or in the case of a TV, the TV is displaying its own information). These cases may include when the A/V device is listed as active or the target, when in a menu navigation mode of the A/V device, etc.

In step 1104, the first control signal for the first control function that is transmitted by the first remote controller is passed through to a device controller of the first device based on the first control signal. For instance, a first control signal may be received from a first remote controller of an A/V device, as described in step 302 of flowchart 300 in FIG. 3, where the first control signal is intended to be for the A/V device itself. SUR controller 208 of FIG. 2 may be configured to pass the control signals received from the A/V device's remote controller through for consumption by the device for various device-specific operations (e.g., by device controller 226) based on the first control signal. For example, system state manager 216 may be configured to monitor the control functions/commands designated in received control signals, such as when control functions/commands designated in received control signals indicate that a specific button(s) pressed on the remote controller instigated the transmission of the control signal.

By way of example and not limitation, control signals may be passed through when they relate to functions/commands for an A/V device menu or home option, an A/V sink device volume control, etc., as such functions/commands may be directed to the A/V device itself and not another A/V device via SUR controller 208. Additionally, a SUR controller menu option command in a control signal may not be passed on to another A/V device, but rather would be consumed by the SUR controller of the A/V device at which the control signal was received.

III. Example Computer Implementations

As noted herein, the embodiments and techniques described herein, including system 100A of FIG. 1A, system 100B of FIG. 1B, system 200 of FIG. 2, system 600 of FIG. 6, system 800 of FIG. 8, GUI 1000 of FIG. 10, along with any components and/or subcomponents thereof, as well as the table(s) and flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC).

Figure 12:
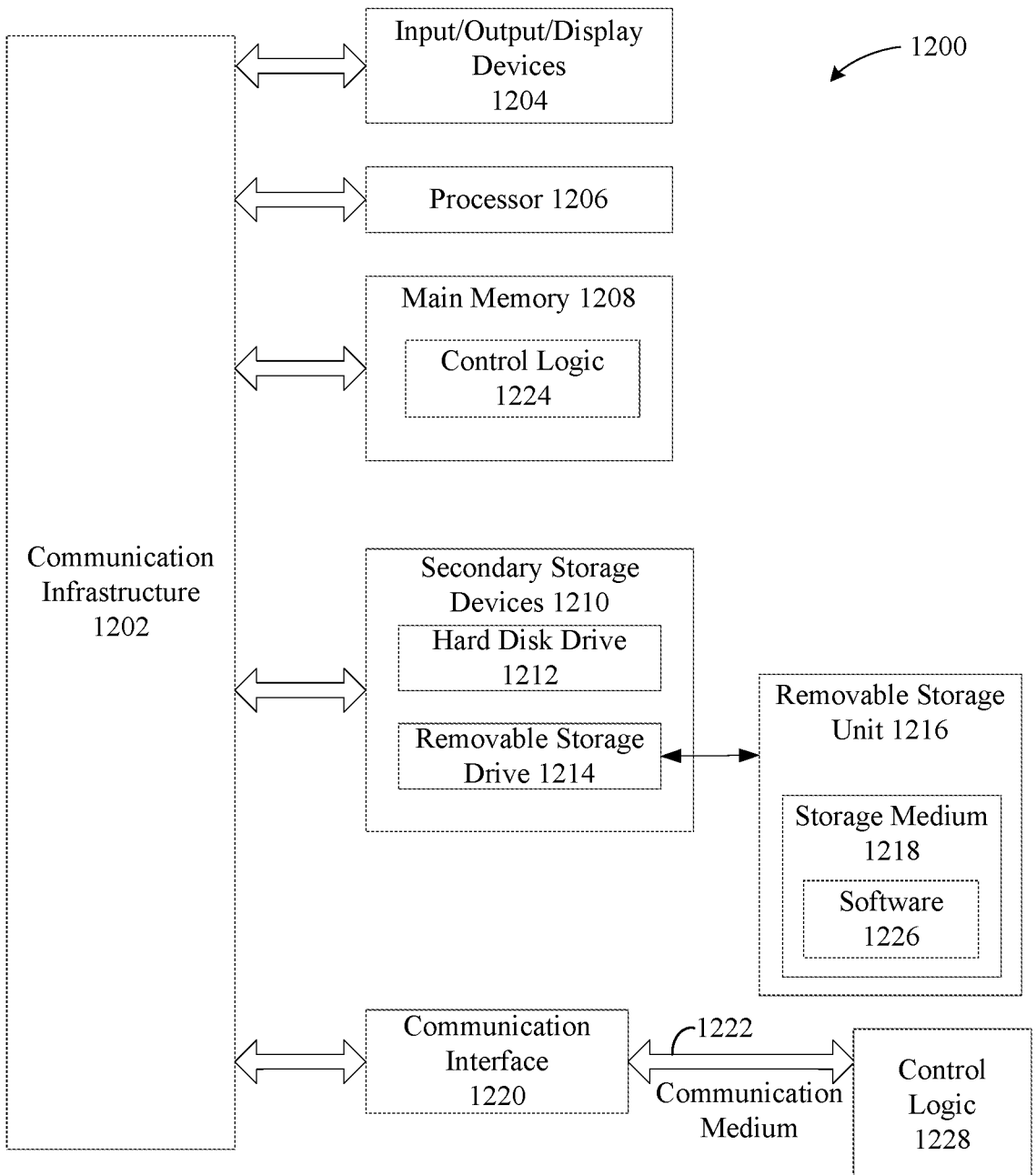
FIG. 12 shows a block diagram of an example processor-based computer system that may be used to implement various example embodiments.

FIG. 12 depicts an example processor-based computer system 1200 that may be used to implement various example embodiments described herein. For example, system 1200 may be used to implement any server, host, system, device (e.g., a remote device), mobile/personal device, etc., as described herein. System 1200 may also be used to implement any of the steps of any of the flowcharts, as described herein. The description of system 1200 provided herein is provided for purposes of illustration, and is not intended to be limiting. Embodiments may be implemented in further types of computer systems, as would be known to persons skilled in the relevant art(s).

As shown in FIG. 12, computing device 1200 includes one or more processors, referred to as processor circuit 1202, a system memory 1204, and a bus 1206 that couples various system components including system memory 1204 to processor circuit 1202. Processor circuit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

Computing device 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1230, one or more application programs 1232, other programs 1234, and program data 1236. Application programs 1232 or other programs 1234 may include, for example, computer program logic (e.g., computer program code or instructions) for implementing system 100A of FIG. 1A, system 100B of FIG. 1B, system 200 of FIG. 2, system 600 of FIG. 6, system 800 of FIG. 8, GUI 1000 of FIG. 10, along with any components and/or subcomponents thereof, as well as the table(s) and flowcharts/flow diagrams described herein and/or further examples described herein.

A user may enter commands and information into the computing device 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in computing device 1200. Display screen 1244 may display information, as well as being a user interface for receiving user commands and/or other information (e.g., by touch, finger gestures, virtual keyboard, etc.). In addition to display screen 1244, computing device 1200 may include other peripheral output devices (not shown) such as speakers and printers.

Computing device 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and modulated data signals (do not include communication media and modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable computing device 1200 to implement features of embodiments discussed herein. Accordingly, such computer programs represent controllers of the computing device 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Advantages and Embodiments

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

Each of multiple instances of a SUR application may be operated independently and/or dependently (e.g., master-slave). Instances of a SUR application (whether whole or partial implementations of a SUR application) may communicate with each other, e.g., using communication capabilities of their respective host devices.

Information about devices collected by SUR instances, such as one or more of hardware configuration, software configuration, interconnections with source and/or sink devices, signaling formats, communication types and procedures, remote controller information, etc. as well as SUR instance configurations (e.g., default and/or by user) may be shared in whole or in part between multiple (e.g., all) SUR instances. One or more (e.g., all) SUR instances may determine which instances and host devices may be best configured or situated to communicate with devices that may not have SUR instances or remote controls. For example, some remote controls and/or devices with SUR instances may be better suited than others to control certain devices. A SUR instance may run one or more configurations to make such determinations, which may be based on user preferences provided through a SUR instance GUI. Communication between devices may be bidirectional using relevant signaling formats, procedures and communication types between respective host devices. Communication procedures may comprise, for example, broadcast or point to point communications.

A control signal received from a first remote controller may be provided by one SUR instance to other SUR instances. SUR instances may engage in decision-making and/or further communications, with one or more instances taking one or more actions, such as changing a TV to a different input source device.

SUR may be implemented with one or more hardware devices or accessories. In an example, a SUR configuration of one or more devices may not provide sufficient capabilities to control all desired devices and/or features of devices. A SUR platform may be expanded, for example, by adding one or more hardware devices or accessories. For example, one or more accessories such as an IR blaster may be added to provide sufficient IR communication capability for full system control by SUR.

Additionally, the novel and unique locations of the SUR controller instances for implementing the described SUR controllers herein are individually configurable and may work independently or in cooperatively, and are effectively, logically, and centrally located in systems between A/V devices. Accordingly, a user may use any hardware remote controller as a universal remote controller for user configurations of A/V devices. Remote controller use may be dynamically alternated without affecting the operation and control of the underlying A/V devices. This provides flexibility for control of entire A/V systems using any remote controller of any A/V device even when a given remote controller is not configured to control any other A/V devices.

Furthermore, older devices that do not support newer interfaces like HDMI may still be controlled via IP or IR communications, according to the SUR controller embodiments and techniques herein. Additional hardware, such as IR blasters, can be added to A/V devices to allow SUR controller functionality. Still further, many different types of communication protocols may be present in an A/V system concurrently and still be support by a SUR controller.

Configurations and settings for SUR controllers may be persistent in A/V devices, or may be accessed on start-up of A/V devices from online storage services (e.g., in the cloud).

Accordingly, the techniques and embodiments herein can render any device remote controller as a SUR controller that may be used to control one or more other devices (e.g., a source device and/or a sink device) that the remote controller may not have been manufactured or configured to control.

The additional examples and embodiments described in this Section may be applicable to examples disclosed in any other Section or subsection of this disclosure.

A SUR controller is described herein. The SUR controller may be a system configured and enabled in various ways to function as a SUR controller, as described herein. The SUR controller includes a first device that is controlled by a first remote controller. The first device includes at least one memory configured to store program instructions for SUR operations, and also includes at least one processor configured to access the at least one memory and to execute the program instructions. In embodiments, the program instructions include communication instructions and controller instructions. The communication instructions are configured to receive a first control signal for a first control function that is transmitted by the first remote controller, and the controller instructions are configured to determine at least one other device for which the first control function is directed, the at least one other device being controllable by at least one other remote controller. The communication instructions are also configured to transmit a second control signal for the first control function to at least one other device, thereby permitting the first remote controller to control the at least one other device without the first remote controller being configured to control the at least one other device.

In an embodiment of the SUR controller, the at least one other remote controller utilizes a different type of remote controller communication protocol than the first remote controller.

In an embodiment of the SUR controller, the first device is an A/V device and the at least one other device comprises two or more A/V source devices, and the controller instructions, to determine the at least one other device, are configured to determine a second device of the at least two A/V source devices based on the second device being currently selected to provide first A/V inputs to an A/V sink device, and generate the second control signal to control the second device.

In an embodiment of the SUR controller, the controller instructions are configured to detect a change from the second device to a third device of the at least two A/V source devices as being currently selected to provide second A/V inputs to the A/V sink device, provide a routing change message via a first consumer electronics control (CEC) command or a first internet protocol (IP) command to the third device and the second device, and provide a set stream message via a second CEC command or a second IP command to the third device.

In an embodiment of the SUR controller, the program instructions further include graphical user interface (GUI) instructions configured to generate a GUI for display by an A/V sink device, the GUI including options selectable by a user of the first remote controller to configure the SUR controller.

In an embodiment of the SUR controller, the program instructions further include GUI instructions configured to generate a GUI for display by an A/V sink device, the GUI including options selectable by a user of the first remote controller to control the at least one other device.

In an embodiment, the SUR controller further includes an external hardware signal transmitter coupled to the first device. The hardware transmission component configured to provide a transmission signal containing information for the second control signal from the communication instructions that is receivable by the at least one other device, and the external hardware signal transmitter is configurable via the GUI.

In an embodiment, the SUR controller further includes a second device that is controlled by a second remote controller, the second device being one of the at least one other device and the second remote controller being one of the at least one other remote controller. The second device includes at least one other memory configured to store the program instructions for SUR operations, and at least other one processor configured to access the at least one other memory and to execute the program instructions. The program instructions include the communicator instructions that are configured to receive a third control signal for a second control function that is transmitted by the second remote controller, and the controller instructions that are configured to determine that the second control function is directed to the first device. The communicator instructions are further configured to transmit a fourth control signal for the second control function to the first device, thereby permitting the second remote controller to control the first device without the second remote controller being configured to control the first device.

In an embodiment of the SUR controller, the first device is an A/V source device, and the controller instructions are configured to pass through the first control signal for the first control function that is transmitted by the first remote controller to a device controller of the first device based on the first device being currently selected to provide A/V inputs to an A/V sink device.

In an embodiment of the SUR controller, the first device is an A/V sink device, and the controller instructions are configured to pass through the first control signal for the first control function that is transmitted by the first remote controller to a device controller of the first device based on the first control signal.

A method is also described herein. The method may be performed by a SUR controller, in embodiments. The method includes receiving a first control signal for a first control function that is transmitted by a first remote controller that controls a first device, and determining at least one other device for which the first control function is directed, the at least one other device being controllable by at least one other remote controller. The method also includes transmitting a second control signal for the first control function to the at least one other device, thereby permitting the first remote controller to control the at least one other device without the first remote controller being configured to control the at least one other device.

In an embodiment of the method, the at least one other remote controller utilizes a different type of remote controller communication protocol than the first remote controller.

In an embodiment of the method, determining at least one other device includes determining a second device of the at least one other device based on the second device being currently selected to provide first A/V inputs to an A/V sink device, and generating the second control signal to control the second device.

In an embodiment, the method further includes detecting a change from the second device to a third device of the at least one other device as being currently selected to provide second A/V inputs to the A/V sink device, providing a routing change message via a first consumer electronics control (CEC) command or a first internet protocol (IP) command to the third device and the second device, and providing a set stream message via a second CEC command or a second IP command to the third device.

In an embodiment, the method further includes at least one of generating a first GUI for display by an A/V sink device, the first GUI including options selectable by a user of the first remote controller to configure the SUR controller, or generating a second GUI for display by the A/V sink device, the second GUI including options selectable by the user of the first remote controller to control the at least one other device.

A computer-readable storage medium is also described herein that has program instructions recorded thereon that, when executed by a processing device, perform a method for a SUR controller, as described herein. In an embodiment, the method includes receiving a first control signal for a first control function that is transmitted by a first remote controller that controls a first device, and determining at least one other device for which the first control function is directed, the at least one other device being controllable by at least one other remote controller. The method may further include transmitting a second control signal for the first control function to the at least one other device, thereby permitting the first remote controller to control the at least one other device without the first remote controller being configured to control the at least one other device.

In an embodiment of the computer readable storage medium, the at least one other remote controller utilizes a different type of remote controller communication protocol than the first remote controller.

In an embodiment of the computer readable storage medium, determining at least one other device includes determining a second device of the at least one other device based on the second device being currently selected to provide first A/V inputs to an A/V sink device, and generating the second control signal to control the second device.

In an embodiment of the computer readable storage medium, the method further includes detecting a change from the second device to a third device of the at least one other device as being currently selected to provide second A/V inputs to the A/V sink device, providing a routing change message via a first consumer electronics control (CEC) command or a first internet protocol (IP) command to the third device and the second device, and providing a set stream message via a second CEC command or a second IP command to the third device.

In an embodiment of the computer readable storage medium, the method further includes at least one of generating a first GUI for display by an A/V sink device, the first GUI including options selectable by a user of the first remote controller to configure the SUR controller, or generating a second GUI for display by the A/V sink device, the second GUI including options selectable by the user of the first remote controller to control the at least one other device.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A soft universal remote (SUR) controller comprising:
a first device comprising an A/V switch that is controlled by control signals provided over a network, the first device further comprising:
at least one network interface configured to receive the control signals;
at least one memory configured to store program instructions for SUR operations; and
at least one processor configured to access the at least one memory and to execute the program instructions, the program instructions comprising:
communicator instructions configured to receive a control signal of the control signals for a control function via the network interface, the control function being applicable to a second device comprising an A/V source device; and
controller instructions configured to determine the control function is directed to the second device, the second device being controllable by an associated remote controller, wherein the controller instructions, to determine the second device, are configured to determine the second device based at least on the second device being currently selected to provide first A/V inputs to an A/V sink device;
the communicator instructions being further configured to transmit a different control signal, for the control function, from the first device to the second device, thereby permitting the second device to be controlled via the received control signal without inputs from the associated remote controller.

2. The SUR controller of claim 1, wherein the control signals are provided over the network using an Internet Protocol (IP) communication format and the associated remote controller utilizes a different type of communication format.

3. The SUR controller of claim 2, wherein the network comprises at least one of a home network, a local area network, or the Internet.

4. The SUR controller of claim 1, wherein the control signal is originated from, and provided via the network by, at least one of a cloud-based service, a personal computing device, or a smart phone.

5. The SUR controller of claim 1,
wherein the controller instructions are further configured to generate the different control signal to control the second device based on at least one of:
the received control signal,
a device type of the second device, or
a type of protocol used to control the second device.

6. The SUR controller of claim 5, wherein the control function is also applicable to the first device; and
wherein the controller instructions are configured to prevent the first device from being controlled according to the control function.

7. The SUR controller of claim 1, wherein the first device comprises a High Definition Multimedia Interface (HDMI) switch, and the second device is configured to provide HDMI signals to the first device; and
wherein the controller instructions, to determine the second device, are configured to determine the second device based at least on monitoring HDMI control signals; and
wherein the controller instructions are further configured to generate the different control signal to control the second device based on at least one of:
the received control signal,
a device type of the second device, or
a type of protocol used to control the second device.

8. A method performed by a soft universal remote (SUR) controller, the method comprising:
receiving, at a first device comprising an A/V switch that is controlled by control signals provided over a network, a control signal of the control signals for a control function via a network interface, the control function being applicable to a second device comprising an A/V source device;
determining, at the first device, that the control function is directed to the second device, the second device being controllable by an associated remote controller, wherein the method, to determine the second device, is configured to determine the second device based at least on the second device being currently selected to provide first A/V inputs to an A/V sink device; and
transmitting a different control signal, for the control function, from the first device to the second device, thereby permitting the second device to be controlled via the received control signal without inputs from the associated remote controller.

9. The method of claim 8, wherein the control signals are provided over the network using an Internet Protocol (IP) communication format and the associated remote controller utilizes a different type of communication format.

10. The method of claim 9, wherein the network comprises at least one of a home network, a local area network, or the Internet.

11. The method of claim 8, wherein the control signal is originated from, and provided via the network by, at least one of a cloud-based service, a personal computing device, or a smart phone.

12. The method of claim 8,
wherein the method further comprises generating the different control signal to control the second device based on at least one of:
the received control signal,
a device type of the second device, or
a type of protocol used to control the second device.

13. The method of claim 12, wherein the control function is also applicable to the first device; and
wherein the method further comprises preventing the first device from being controlled according to the control function.

14. The method of claim 8, wherein the first device comprises a High Definition Multimedia Interface (HDMI) switch, and the second device is configured to provide HDMI signals to the first device;
wherein the method, for determining the second device, further comprises determining the second device based at least on monitoring HDMI control signals; and
wherein the method further comprises generating the different control signal to control the second device based on at least one of:
the received control signal,
a device type of the second device, or
a type of protocol used to control the second device.

15. A computer readable storage medium having program instructions recorded thereon that, when executed by a processing device, perform a method for a soft universal remote (SUR) controller, the method comprising:
receiving, at a first device comprising an A/V switch that is controlled by control signals provided over a network, a control signal of the control signals for a control function via a network interface, the control function being applicable to a second device comprising an A/V source device;
determining, at the first device, that the control function is directed to the second device, the second device being controllable by an associated remote controller, wherein the method, to determine the second device, is configured to determine the second device based at least on the second device being currently selected to provide first A/V inputs to an A/V sink device; and
transmitting a different control signal, for the control function, from the first device to the second device, thereby permitting the second device to be controlled via the received control signal without inputs from the associated remote controller.

16. The computer readable storage medium of claim 15, wherein the control signals are provided over the network using an Internet Protocol (IP) communication format and the associated remote controller utilizes a different type of communication format.

17. The computer readable storage medium of claim 16, wherein the network comprises at least one of a home network, a local area network, or the Internet.

18. The computer readable storage medium of claim 15, wherein the control signal is originated from, and provided via the network by, at least one of a cloud-based service, a personal computing device, or a smart phone.

19. The computer readable storage medium of claim 15, wherein the control function is also applicable to the first device; and
wherein the method further comprises at least one of:
generating the different control signal to control the second device based on at least one of:
the received control signal,
a device type of the second device, or
a type of protocol used to control the second device; or
preventing the first device from being controlled according to the control function.

20. The computer readable storage medium of claim 15, wherein the first device comprises a High Definition Multimedia Interface (HDMI) switch, and the second device is configured to provide HDMI signals to the first device;
wherein the method, for determining the second device, further comprises determining the second device based at least on monitoring HDMI control signals; and
wherein the method further comprises generating the different control signal to control the second device based on at least one of:
the received control signal,
a device type of the second device, or
a type of protocol used to control the second device.

21. A soft universal remote (SUR) controller comprising:
a first device comprising an A/V switch that is controlled by control signals provided wirelessly, the first device further comprising:
at least one wireless interface configured to receive the control signals;
at least one memory configured to store program instructions for SUR operations; and
at least one processor configured to access the at least one memory and to execute the program instructions, the program instructions comprising:
communicator instructions configured to receive a control signal of the control signals for a control function of the wireless interface, the control function being applicable to a second device comprising an A/V source device; and
controller instructions configured to determine the control function is directed to the second device, the second device being controllable by an associated remote controller, wherein the controller instructions, to determine the second device, are configured to determine the second device based at least on the second device being currently selected to provide first A/V inputs to an A/V sink device;
the communicator instructions being further configured to transmit a different control signal, for the control function, from the first device to the second device, thereby permitting the second device to be controlled via the received control signal without inputs from the associated remote controller.

* * * * *